(12) United States Patent
Ubale (10) Patent No.: US 7,079,498 B2
(45) Date of Patent: Jul. 18, 2006

(54) METHOD, APPARATUS, AND SYSTEM FOR REDUCING MEMORY REQUIREMENTS FOR ECHO CANCELLERS

(75) Inventor: Anil W. Ubale, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 922 days.

(21) Appl. No.: 10/172,269

(22) Filed: Jun. 14, 2002

(65) Prior Publication Data

US 2003/0231617 A1 Dec. 18, 2003

(51) Int. Cl.
*H04B 3/23* (2006.01)
*H04L 12/66* (2006.01)

(52) U.S. Cl. .................. 370/286; 370/356; 379/406.01

(58) Field of Classification Search ................ 370/286, 370/352, 356, 401, 287; 379/406.01
See application file for complete search history.

(56) References Cited

U.S. PATENT DOCUMENTS

| | | | |
|---|---|---|---|
| 4,528,676 A | | 7/1985 | Mein et al. |
| 5,321,776 A | * | 6/1994 | Shapiro ....................... 382/240 |
| 6,580,696 B1 | * | 6/2003 | Chen et al. .................. 370/286 |
| 2002/0075818 A1 | * | 6/2002 | Matsuo ......................... 370/286 |
| 2003/0007633 A1 | * | 1/2003 | Tucker et al. ............. 379/406.8 |
| 2003/0031242 A1 | * | 2/2003 | Awad et al. ................. 375/232 |
| 2003/0086382 A1 | * | 5/2003 | Song et al. .................. 370/286 |

FOREIGN PATENT DOCUMENTS

| | | |
|---|---|---|
| EP | 0 098 000 A2 | 1/1984 |
| EP | 0 152 172 A1 | 8/1985 |
| EP | 0 303 363 A2 | 5/1989 |

OTHER PUBLICATIONS

Zdenek Brun, Controlled Carrier Operation in a Memory Based Echo Cancelling Data Set, World Prosperity through Communiocations, Boston, Jun. 11-14, 1989, International Conference on Communications, New York, IEEE, US, vol. 1, Jun. 11, 1989, pp. 254-260.

* cited by examiner

*Primary Examiner*—Min Jung
(74) *Attorney, Agent, or Firm*—Blakely, Sokoloff, Taylor & Zafman LLP (57) ABSTRACT

According to one embodiment of the invention, a method is provided in which a first set of coefficients is generated for performing echo cancellation in a voice-over-packet (VoP) system. Each coefficient is represented by a first number of bits which includes a first portion representing the sign of the respective coefficient and a second portion representing the magnitude of the respective coefficient. The first set of coefficients is compressed to generate a second set of coefficients which requires less memory storage than the first set of coefficients, in which coefficients which have higher values are encoded before coefficients which have lower values until a predetermined compression ratio is satisfied or until all coefficients in the first set have been encoded.

30 Claims, 8 Drawing Sheets

METHOD, APPARATUS, AND SYSTEM FOR REDUCING MEMORY REQUIREMENTS FOR ECHO CANCELLERS

FIELD

An embodiment of the invention relates to the field of signal processing and communications, and more specifically, relates to a method, apparatus, and, system for reducing memory requirements and improving convergence performance for echo cancellers.

BACKGROUND

In recent years, communication systems and services have continued to advance rapidly in light of various technological advances and improvements with respect to telecommunication networks and protocols, in particular packet-switched networks such as the Internet. A considerable interest has been focused on Voice-over-Packet systems. Generally, Voice-over-Packet (VoP) systems, also known as Voice-over-Internet-Protocol (VoIP) systems, include several processing components that operate to convert voice signals into a stream of packets that are sent over a packet-switched network such as the Internet and convert the packets received at the destination back to voice signals. One of the processing components in a VoP system is a device called echo canceller that is used to perform echo cancellation. An echo canceller can be implemented as one of the components included in a digital signal processing (DSP) chip or device (also called digital signal processor herein). A DSP device may include one or more digital signal processor cores that perform the processing of voice and/or data signals and a global memory that is used by various components of the DSP device to perform their corresponding functions. For example, an echo canceller in a DSP device may require a large amount of dynamic memory in the global memory to perform its echo cancellation function.

Generally, the dynamic memory required by the echo canceller to perform its corresponding function is transferred via direct memory access (DMA) mechanisms into and out of the DSP cores from and to the global memory for every frame. A frame can be defined as a time interval over which processing functions are performed to generate a corresponding voice packet from corresponding voice input signals. Typically, a DSP device can be configured to perform voice and packet processing for multiple VoP channels and each VoP channel can have its own persistent dynamic memory storage in the global memory. Accordingly, the number of VoP channels that can be processed by a DSP device depends, among other factors, on the dynamic memory requirements of the echo canceller functional block. Thus, higher channel densities can be achieved if the dynamic memory requirements of the echo canceller can be reduced without significant quality impairment of voice signals.

In general, a substantial portion of the dynamic memory requirements of an echo canceller is allocated for storing filter coefficients (also called coefficients herein) that are used in the echo cancellation process. One way to reduce the storage requirements for coefficients is to compress them using lossless compression methods such as Huffman coding, arithmetic coding, etc. While lossless compression methods can be used to ensure that there are no quality impairments to the voice signals in performing echo cancellation, lossless compression methods have various disadvantages as follows:

Lossless compression results in variable number of memory (e.g., bits) requirement per frame. Therefore, channel densities can be increased on a statistical average basis, but not deterministically.

In the worst case, the number of bits required to store the coefficients can be higher than that by not doing any compression. This case can be avoided by using lossless compression (lossless coding) only when it helps. However, information regarding whether or not lossless coding is done needs to be stored as side-information with a small increase in storage requirement.

The entropy of echo-canceller coefficients (the theoretical lower limit on bits per coefficient requirement) using one-dimensional symbols turns out to be 10 and a few tenths of a bit. Thus the best-case savings in memory using one-dimensional lossless coding is not even 50%.

The complexity of lossless coding and decoding is high.

In contrast, lossy compression methods can overcome the disadvantages of lossless compression methods, but could result in quality impairment. Accordingly, there exists a need to reduce the memory requirements of echo-cancellers without significant quality impairment to the voice signals.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following detailed description numerous specific details are set forth. However, it is understood that embodiments of the invention may be practiced without these specific details.

In recent years, VoP technology has been increasingly used to convert voice, fax, and data traffic from circuitswitched format used in telephone and wireless cellular networks to packets that are transmitted over packet-switched networks via Internet Protocol (IP) and/or Asynchronous Transfer Mode (ATM) communication systems. VoP systems can be implemented in various ways depending on the applications. For example, a voice call can be made from a conventional telephone to another conventional telephone via the Public Switched Telephone Network (PSTN) connected to corresponding VoP gateway and packet-switched network such as the Internet. As another example, voice communication can be established between a conventional telephone and a personal computer that is equipped with a voice application via PSTN, VoP gateway, and the Internet.

Figure 1:
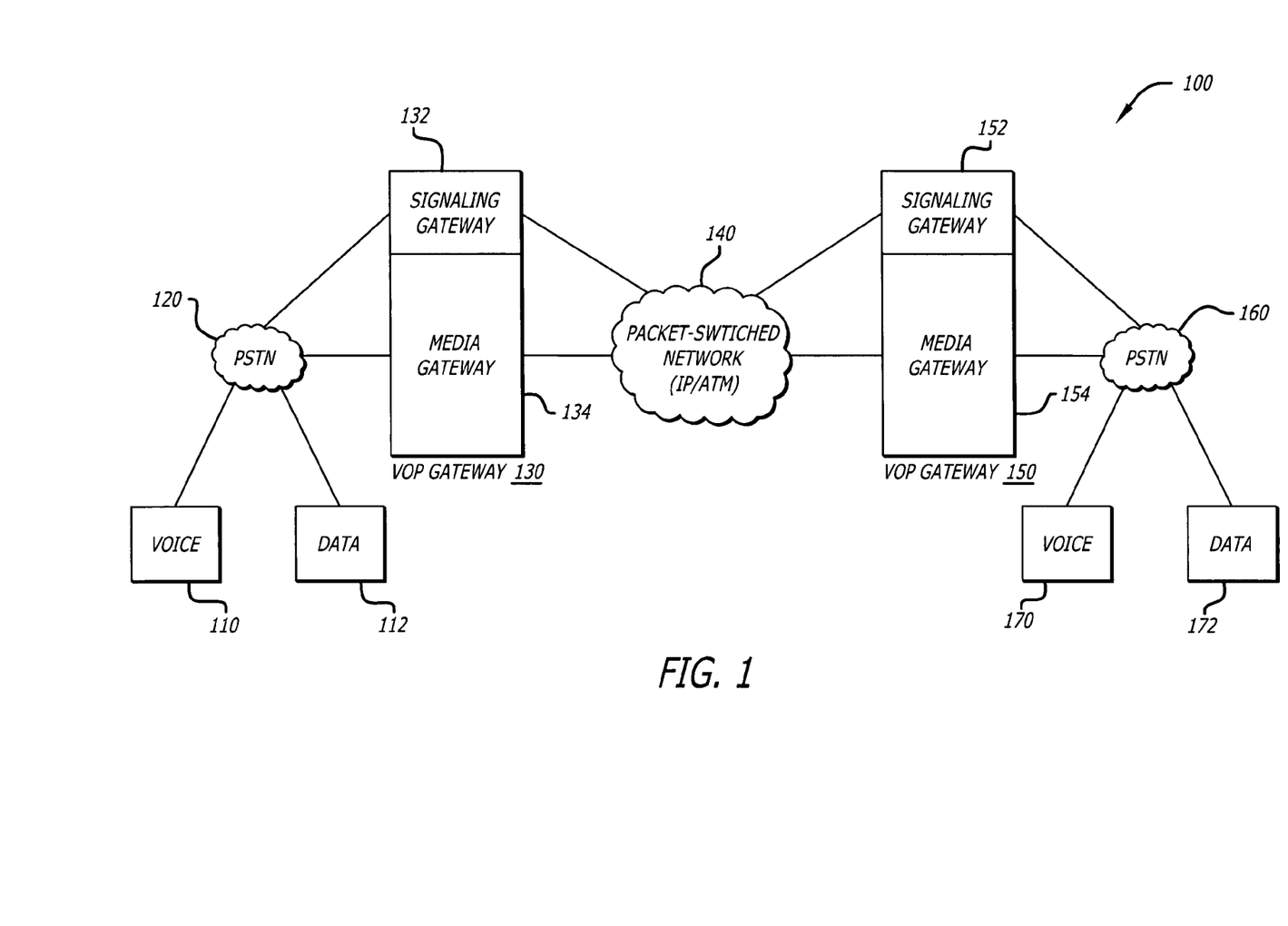
FIG. 1 shows a block diagram of one embodiment of a system in which the teachings of the present invention are implemented.

FIG. 1 illustrates a block diagram of one embodiment of a system 100 in which the teachings of the present invention are implemented. As shown in FIG. 1, the system 100 includes a voice communication device 110 and data communication 112 that are connected to VoP gateway system 130 via PSTN 120. In one embodiment, the VoP gateway system 130 includes corresponding signaling gateway subsystem 132 and media gateway subsystem 134 that are connected to packet-switched network (e.g., IP/ATM network) 140. The system 100 further includes voice communication device 170 and data communication device 172 that are connected to VoP gateway system 150 via PSTN 160. In one embodiment, the VoP gateway system 150 includes corresponding signaling gateway subsystem 152 and media gateway subsystem 154 that are connected to the packet-switched network 140. In one embodiment, voice communication devices 110 and 170 can be telephones or computers equipped with voice applications, or other types of devices that are capable of communicating voice signals. Data communication devices 112 and 172 can be fax machines, computers, or other types of devices that are capable of communicating data signals.

As shown in FIG. 1, a voice communication session (e.g., a voice call) can be established between voice devices 112 and 172 via the PSTN 120, the VoP gateway 130, the packet-switched network 140, the VoP gateway 150, and the PSTN 160. For example, a voice call can be initiated from the voice device 110 which converts analog voice signals to linear pulse code modulation (PCM) digital stream and transmits the PCM digital stream to the VoP gateway 130 via PSTN 120. The VoP gateway system 130 then converts the PCM digital stream to voice packets that are transmitted over the packet-switched network (e.g., the Internet) 140. At the receiving side, the VoP gateway system 150 converts received voice packets to PCM digital stream that is transmitted to the receiving device (e.g., voice device 170). The voice device 170 then converts the PCM digital stream to analog voice signals.

Figure 2:
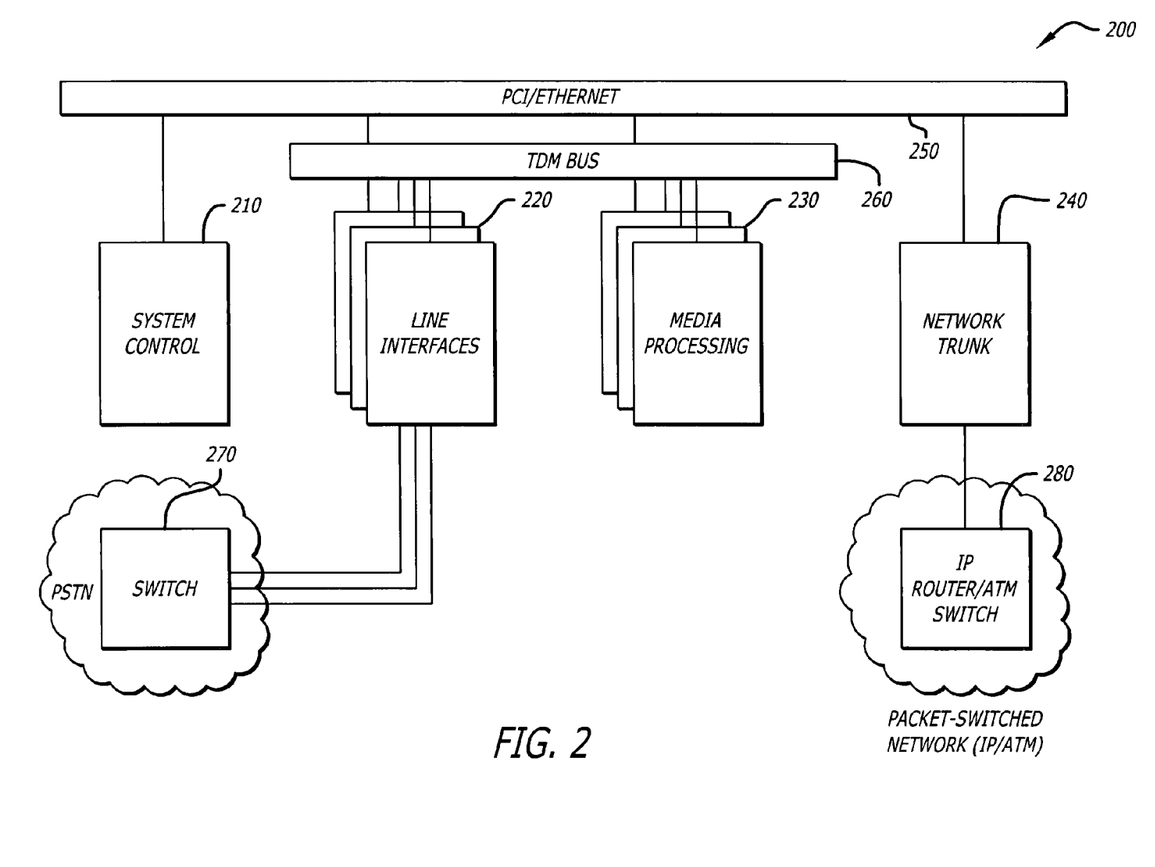
FIG. 2 illustrates a block diagram of one embodiment of a VoP gateway in which the teachings of the present invention are implemented.

FIG. 2 illustrates a block diagram of one embodiment of an exemplary VoP gateway system 200 (e.g., the VoP gateway system 120 or 150 illustrated in FIG. 1) in which the teachings of the present invention are implemented. As shown in FIG. 2, the VoP gateway system 200, for one embodiment, includes a system control component 210 (also called system control unit system control card herein), one or more line interface components 220 (also called line interface units or line cards herein), one or more media processing components 230 (also called media processing units, media processing cards, or media processors herein), and a network trunk component 240 (also called network trunk unit or network trunk card herein). As shown in FIG. 2, the various components 210, 220, 230, and 240 are connected to each other via PCI/Ethernet bus 250. The line cards 220 and media processing cards 230 can be connected via a time-division multiplexing (TDM) bus 260 (e.g., H.110 TDM backplane bus). The line cards 220, in one embodiment, are connected to PSTN via switch 270 (e.g., a class 5 switch). The network trunk card 240 is connected to a packet-switched network (e.g., IP or ATM network) via IP router/ATM switch 280. In one embodiment, the system control card 210 is responsible for supervisory control and management of the VoP gateway system 200 including initialization and configuration of the subsystem cards, system management, performance monitoring, signaling and call control. In one embodiment, the media processing cards 230 perform the TDM to packet processing functions that involve digital signal processing (DSP) functions on voice-band traffic received from the line cards 230, packetization, packet aggregation, etc. In one embodiment, the media processing cards 230 perform voice compression/decompression (encoding/decoding), echo cancellation, DTMF and tones processing, silence suppression (VAD/CNG), packetization and aggregation, jitter buffer management and packet loss recovery, etc.

Figure 3:
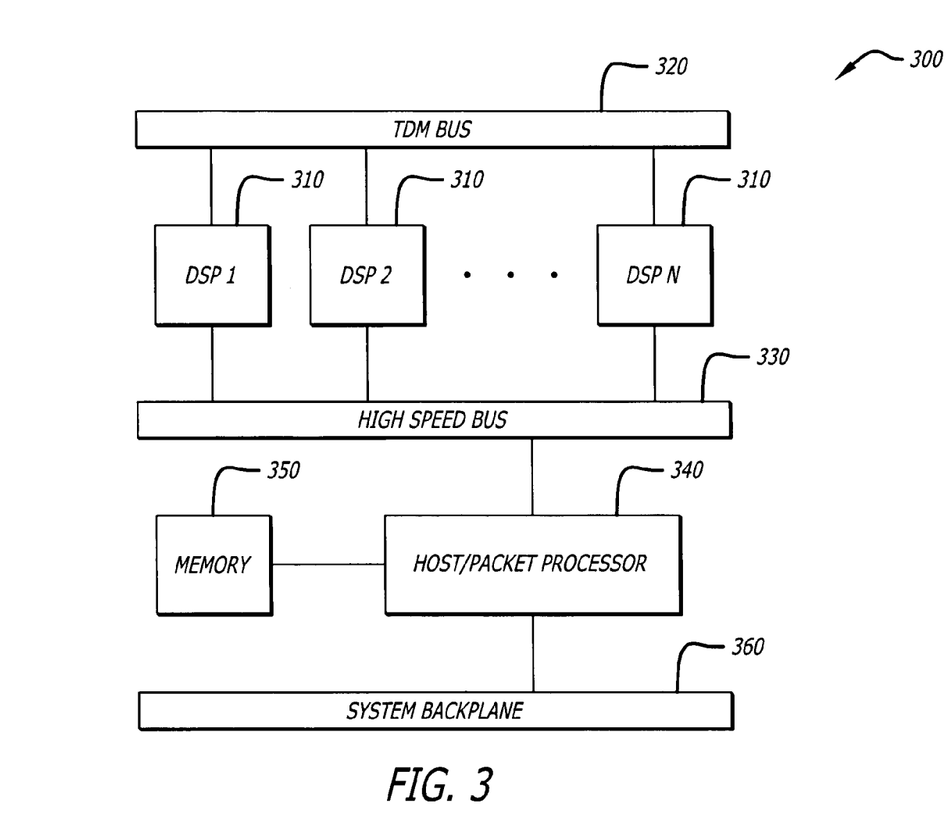
FIG. 3 shows a block diagram of one embodiment of a voice processing subsystem in which the invention is implemented.

FIG. 3 illustrates a block diagram of one embodiment of an exemplary media processing component or subsystem 300 (e.g., the media processing card 230 shown in FIG. 2). In one embodiment, the media processing subsystem 300 includes one or more digital signal processing (DSP) units (also called digital signal processors) 310 that are coupled to a TDM bus 320 and a highs-speed parallel bus 330. The media processing subsystem 300 further includes a host/packet processor 340 that are coupled to a memory 350, the high-speed parallel bus 330, and system backplane 360. In one embodiment, the DSPs 310 are designed to support parallel, multi-channel signal processing tasks and include components to interface with various network devices and buses. In one embodiment, each DSP 310 includes a multi-channel TDM interface (not shown) to facilitate communications of information between the respective DSP and the TDM bus. Each DSP 310 also includes a host/packet interface (not shown) to facilitate the communication between the respective DSP and the host/packet processor 340. In one embodiment, the DSPs 310 perform various signal processing tasks for the corresponding media processing cards which may include voice compression/decompression (encoding/decoding), echo cancellation, DTMF and tones processing, silence suppression (VAD/CNG), packetization and aggregation, jitter buffer management and packet loss recovery, etc.

Figure 4:
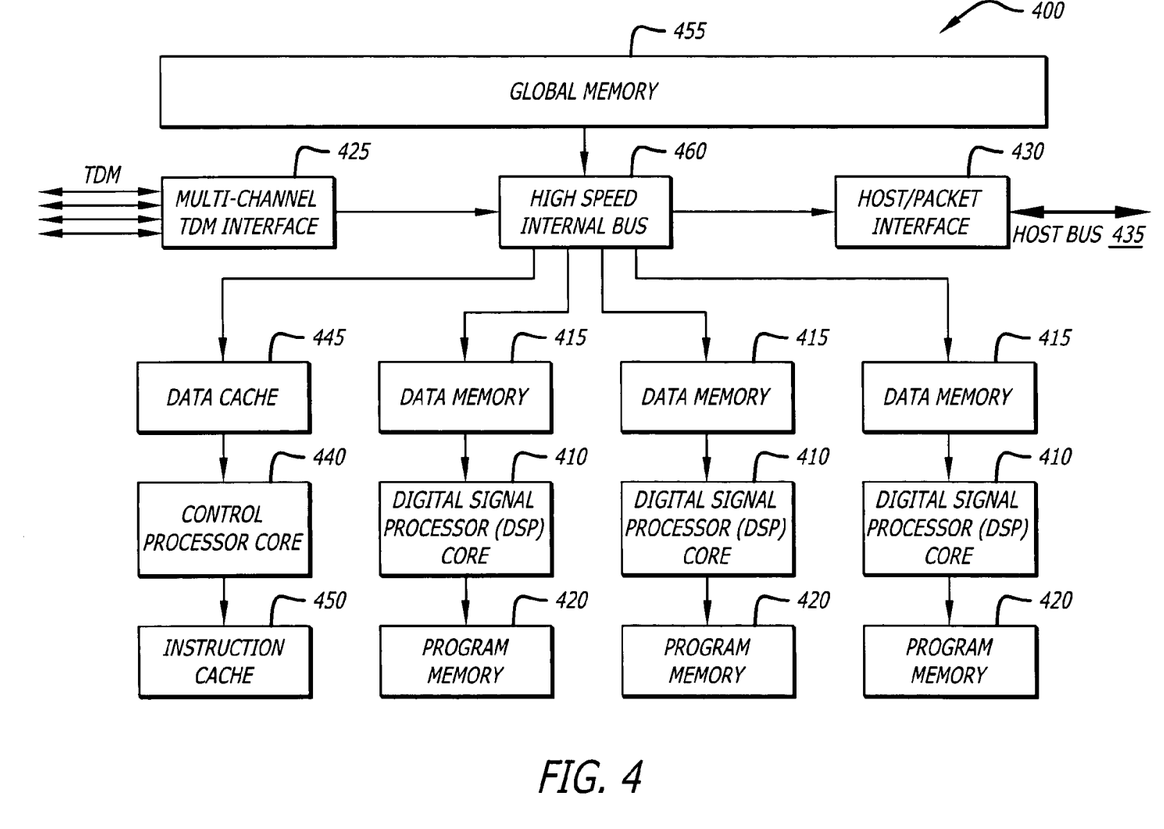
FIG. 4 shows a block diagram of one embodiment of an exemplary digital signal processor in which the teachings of the present invention are implemented.

FIG. 4 shows a block diagram of one embodiment of an exemplary digital signal processor (e.g., DSP 310) in which the teachings of the present invention are implemented. As shown in FIG. 4, in one embodiment, the DSP 310 may include multiple DSP cores 410 to process voice and data signals. The DSP 310 further includes local data memory 415 and local program memory 420 for each respective DSP core 410. The DSP 310 also includes a multi-channel TDM interface 425 and a host/packet bus interface 430 coupled to host bus 435. In one embodiment, the multi-channel TDM interface 425 includes four full-duplex multi-channel TDM serial interfaces that are coupled to four full-duplex serial ports. In one embodiment, the host bus interface 430 is a 32-bit parallel host bus interface configured for transferring voice packet data and programming the DSP device. As shown in FIG. 4, the DSP 310 further includes a control processor core 440 coupled to a data cache 445 and an instruction cache 450. In one embodiment, the control processor core 440 is responsible for scheduling tasks and managing data flows for the various DSP cores 410, and managing communication with an external host processor (not shown). The DSP 310, in one embodiment, includes a global memory 455 that is used to store programs and data required for voice and data processing. The DSP 310 further includes a high speed internal bus 460 and distributed DMA controllers (not shown) to provide the DSP cores with fast access to data in the global memory 455.

Figure 5:
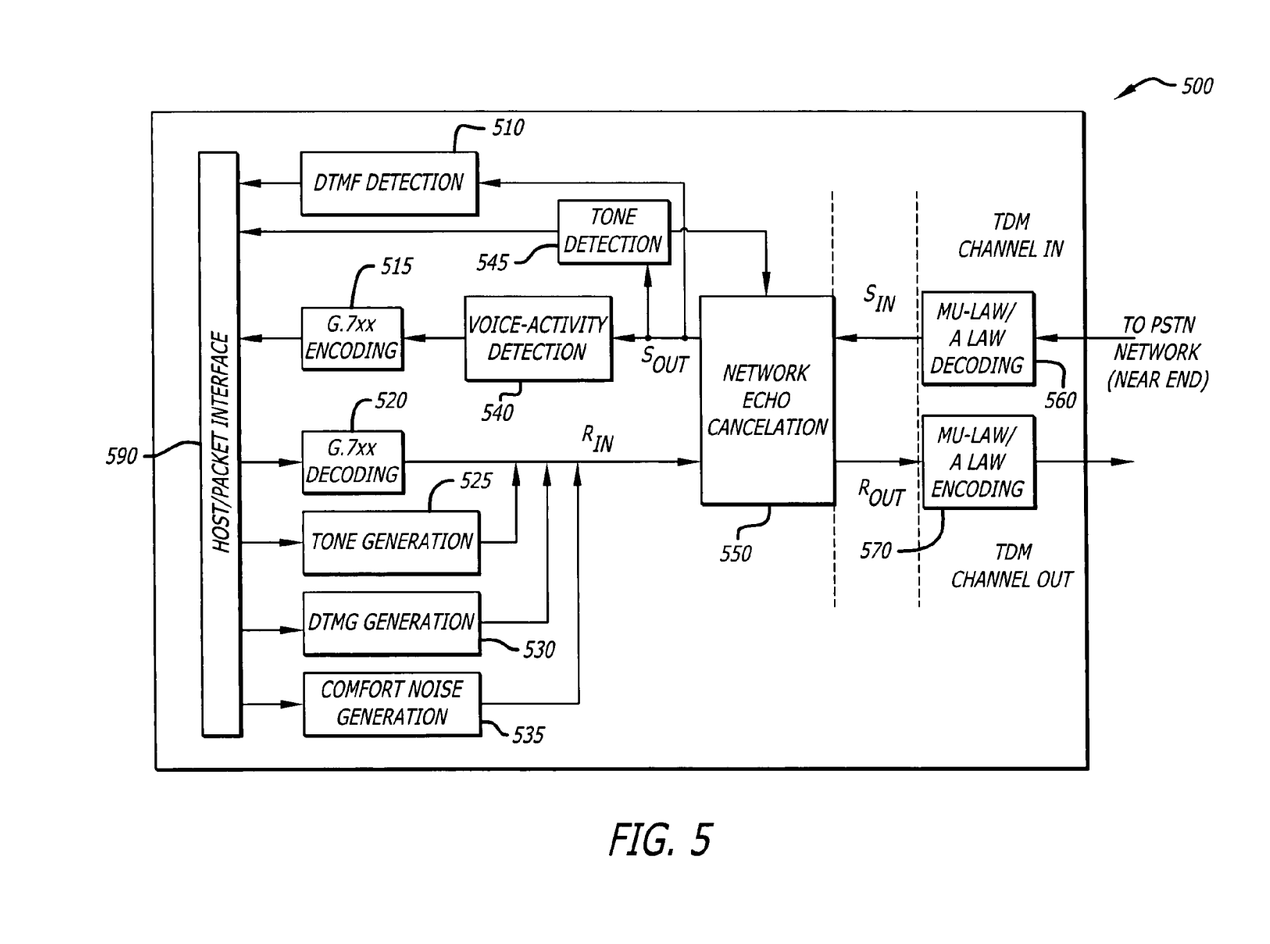
FIG. 5 shows a more detailed block diagram of one embodiment of an exemplary digital signal processor core including an echo canceller.

FIG. 5 shows a more detailed block diagram of one embodiment of an exemplary digital signal processor (DSP) core 500 (e.g., DSP core 410 shown in FIG. 5). As shown in FIG. 5, DSP core 500 includes a DTMF detection unit 510, a G.7xx encoder 515, a G.7xx decoder 520, a tone generation unit 525, a DTMF generation unit 530, and a comfort noise generation (CNG) unit 535 that are coupled to host/packet interface unit 590. The DSP core 500 further includes a voice activity detection (VAD) unit 540, a tone detection unit 545, a network echo cancellation unit (also called echo canceller herein) 550, μ-Law/A-Law decoding unit 560, and μ-Law/A-Law encoding unit 570.

In one embodiment, the μ-Law/A-Law decoding unit 560 decodes encoded speech into linear speech data and the μ-Law/A-Law encoding unit 570 encodes linear speech data into μ-Law/A-Law encoded speech. In one embodiment, TDM signals are received from the near end and are converted into pulse-code modulated (PCM) linear data samples $S_{in}$. These PCM linear data samples $S_{in}$ are inputted into the network echo-cancellation unit 550. In one embodiment, the network echo-cancellation 550 operates to remove an echo estimated signal from the PCM linear data samples $S_{in}$ to generate PCM linear data samples $S_{out}$. The PCM linear data samples $S_{out}$ are provided to the DTMF detection unit 510, the VAD unit 540, and the tone detection unit 545.

In one embodiment, the decoded speech samples from the far end are PCM linear data samples Rin and are provided into the network echo cancellation unit 550. The network echo cancellation unit 550 copies $R_{in}$ for echo cancellation processing and passes it out as PCM linear data samples $R_{out}$. The PCM linear data samples $R_{out}$ are provided to the μ-Law/A-Law encoding unit 570.

In one embodiment, the VAD unit 540 is used to detect the presence or absence of silence in a speech segment. When the VAD 540 detects silence, background noise energy is estimated and an encoder therein generates a Silence-Insertion Description (SID) frame. In response to receiving an SID frame at the opposite end (i.e., the Far End), the CNG unit 535 generates a corresponding comfort noise or simulated silence for a period of time.

As discussed above, an echo canceller in a DSP device such as the echo canceller 550 shown in FIG. 5 may require a large amount of dynamic memory in the global memory to perform its echo cancellation function. Typically, the dynamic memory required by the echo canceller to perform its corresponding function is transferred via direct memory access (DMA) mechanisms into and out of the DSP cores from and to the global memory for every frame. A DSP device as described above can be configured to perform voice and packet processing for multiple VoP channels and each VoP channel can have its own persistent dynamic memory storage in the global memory. The number of VoP channels that can be processed by a DSP device depends, among other factors, on the dynamic memory requirements of the echo canceller functional block (e.g., echo canceller 550). Thus, higher channel densities can be achieved if the dynamic memory requirements of the echo canceller can be reduced without significant quality impairment of voice signals.

Figure 6:
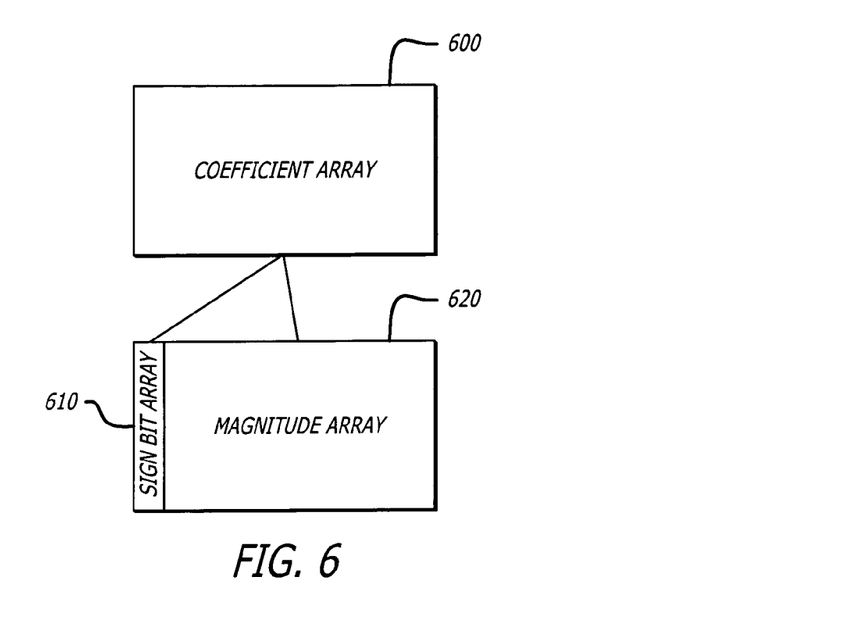
FIG. 6 illustrates shows an exemplary representation of a coefficient array in accordance with one embodiment of the present invention.

FIG. 6 illustrates shows an exemplary representation of a coefficient array 600 in accordance with one embodiment of the present invention. In one embodiment, coefficient array 600 is used to store filter coefficients used in the echo cancellation process performed by an echo canceller (e.g., echo canceller 550 shown in FIG. 5). As shown in FIG. 6, the coefficient array may be viewed as representing two arrays (or sub-arrays) 610 and 620. Array 610 is a sign-bit array and Array 620 is a magnitude array. In the discussion that follows, it is assumed for purposes of illustration and explanation that each coefficient stored in the coefficient array is 16-bit wide and that 1 bit is used to represent the sign and 15 bits are used to represent the magnitude of each coefficient. In one embodiment, the sign bit in the sign-bit array is 1 if the corresponding coefficient is negative (<0) and 0 if the corresponding coefficient is non-negative (>=0). In one embodiment, the magnitude part in the magnitude array is the absolute value of the corresponding coefficient. As an example, if the coefficient=228, then the sign-bit=0, and the magnitude=228. In this case, the respective row of the sign-bit array 610 is one bit long and has a value of 0 and the respective row of the magnitude-bit array 620 is 15 bit long and has a value of 000,0000,1110,0100. As another example, consider coefficient=−2585, in this case the sign-bit array row is 1 and magnitude-bit array row is 000,1010, 0001,1001. A special case should be noted when the coefficient=−32768, which is the maximum negative number in this example. In this case, the sign-bit array row is 1 and magnitude-bit array row is 111,1111,1111,1111. As such, the sign-bit array has one bit per coefficient and the magnitude array has 15 bits per coefficient. It should be recognized by one skilled in the art that the teachings of the present invention are not limited to specific examples of coefficient array structures discussed herein but can be applied to other representations of coefficients in array or other data structures of various sizes and formats.

As discussed above, higher channel densities can be achieved if the dynamic memory requirements of the echo canceller can be reduced without significant quality impairment of voice signals. In one embodiment, a substantial portion (e.g., approximately half) of the dynamic memory requirements of an echo canceller is allocated for storing filter coefficients that are used in the echo cancellation process.

Continuing with the present discussion, it is assumed that a bit-quota is set for each frame in order to achieve desirable channel densities. For example, for a 512-tap echo-canceller, the storage requirement for storing the echo-canceller coefficients for a frame is 512*16 or 8192 bits (assuming again that 16 bits is required for each coefficient). For a 50% reduction of storage requirement for the coefficient array, a bit-quota of 4096 bits per frame or 8 bits per coefficient can be set. Assuming that the sign-bit array is coded as it is (e.g., 1 sign-bit per coefficient), then 512 bits are used to store signs of coefficients. Thus, 3584 bits are left for storing the magnitudes of the coefficients. In other words, for a 50% reduction in storage requirement for the coefficient array in this example, the sign-bit array requires 512 bits of dynamic memory storage and the magnitude array requires 3584 bits of dynamic memory storage. Thus, for a 50% reduction or 50% compression ratio in memory requirement for the coefficient array, the coefficient array needs to be compressed from 8192 bits to 4096 bits of which 512 bits of the compressed coefficient array are used to store the signs of the coefficients.

Figure 7:
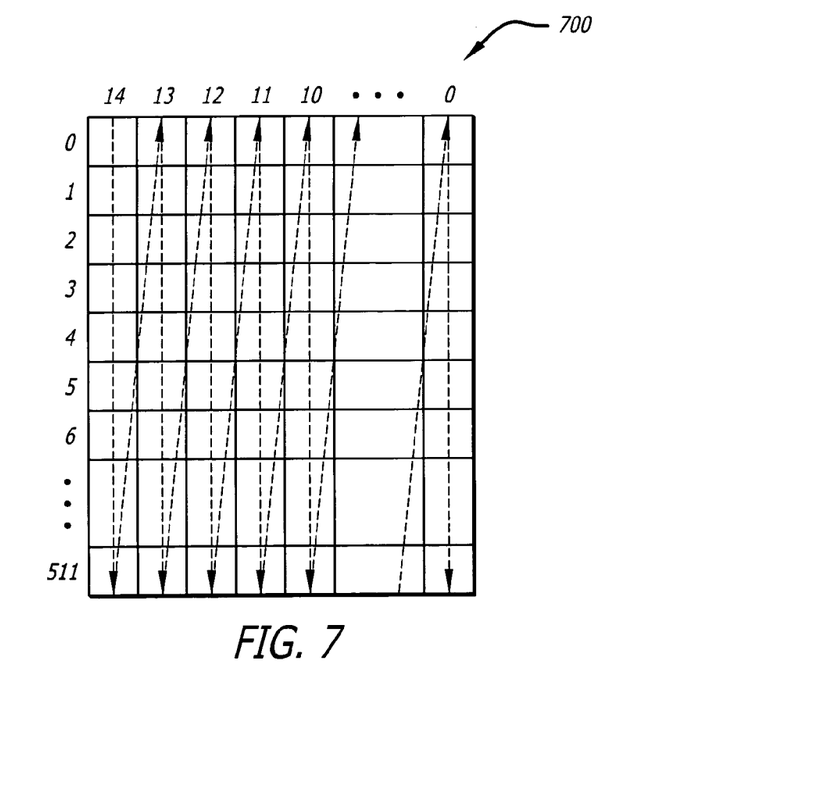
FIG. 7 shows an exemplary representation of a magnitude sub-array of a coefficient array in accordance with one embodiment of the present invention.

In one embodiment, as shown in FIG. 7, the magnitude array can be considered as a two-dimensional array in which row numbers represent taps or coefficients, and column numbers represent bits. In this example, coefficients 0 to 511 are from top to bottom, and bits 14 to 0 (MSB to LSB) are from left to right. As such, the magnitude array (before compression) as shown in FIG. 7 can be considered a 512×15 array. It should be noted that some savings in storage requirements can be achieved by discarding or throwing away the 0 bits (the bits having values of zero) in the left-side of this array without incurring any loss. In other words, the most significant bits of each coefficient which have zero values can be discarded without incurring quality impairment in echo cancellation processing.

In one embodiment, the compression of the coefficient array to achieve the desired reduction or compression ratio (e.g., the bit quota) with minimal quality impairment is performed as follows. The idea here is to introduce quality impairment or distortion in the voice signal that is least perceptible to the human ear. As such, coefficients which have higher values (which are more significant) should be encoded before those coefficients which have lower values and thus are less significant. Due to the memory limitation (e.g., the bit quota), the available memory should be used to store the coefficients with the higher values. Accordingly, in one embodiment, coefficients with higher values are processed (e.g., identified, encoded and stored) in the compressed coefficient array before the coefficients with lower values are processed. In one embodiment, the compression process as described herein continues until there is no more available memory (the bit quota has been met) or until all coefficients in the original coefficient array (also called the uncompressed coefficient array) have been processed.

In one embodiment, the original (uncompressed) magnitude array is traversed from the left top of the array to the right bottom of the array in a zig-zag fashion (e.g., down to bottom, then up to top and right, the down again) until a non-zero bit (a bit having a value of 1, also called a "1" bit herein) is encountered or hit. When this happens, the non-zero bit encountered is the left most non-zero MSB of the respective coefficient. In one embodiment, the position of this bit is coded using m bits where m=[$\log_2$(bits/coefficient)]+[$\log_2$(taplength)], where [x] is a lowest integer equal to or greater than x. In this case, the coefficient identified is one of the higher or larger coefficients. In one embodiment, this coefficient is packed with full precision. The number of bits required is given by the corresponding column position which is coded with 4 bits (e.g., [$\log_2(15)$]) already. Once a coefficient is coded, it is then removed from the magnitude array so that it will not be processed again. In one embodiment, to remove the respective coefficient that has been coded, its bits are zeroed out in the magnitude array (e.g., the bits of the respective coefficient are replaced with zero bits). The traversing of the magnitude array in the same zig-zag manner is continued until the next "1" bit is hit. Again, when this happens, the position of the respective bit is coded and the respective coefficient is coded with full precision as required. As such, the higher or stronger coefficients are chosen and coded with just enough precision. The process is continued until there are no more bits available (i.e., the bit quota has been reached) or until the right bottom of the two dimensional magnitude array has been reached (i.e., all coefficients have been processed).

Referring to the example of the two dimensional magnitude array shown in FIG. 7, it can be seen that this is a 512×15 array. There are 512 rows (row 0 to row 511 with row 0 starting at the top of the array) and 15 columns (column 0 to column 14 with column 14 starting from the left). Each bit in this array can be referred to by its relative position with the left top position being at row 0 and column 14 or (0,14) and the right bottom position being at row 511 and column 0 or (511,0). As shown in FIG. 7, the process traverses the magnitude array from the left top position of the magnitude array to the right bottom of the magnitude array in a zig-zag fashion. In other words, the process starts at position (0,14) and traverses down column 14 until it reaches the last position in column 14 at (511,14) and then goes up to position (0,13) and traverses down column 13 until it reaches position (511,13), and so on. As described above, the magnitude array is traversed in this manner until a "1" bit is hit. When this happens, the respective position is coded and the respective coefficient is coded with full precision. The coefficient that has been processed is then removed (e.g., zeroed out) from the magnitude array so that it will not be processed again during the remaining traversal of the magnitude array. This compression process is continued until the bit-quota is met (i.e., the desired compression ratio is achieved) or until the coefficient located at the right bottom of the magnitude array (position (511,0)) has been processed. It can be seen that the compression method that has just been described above in accordance with one embodiment of the present invention provides a novel way to reduce memory requirements for the echo canceller (e.g., dynamic memory required for storing coefficients) with minimal quality impairment or distortion because higher priority is given to the stronger coefficients during the compression process (i.e., the higher or stronger coefficients are processed before the lower or weaker coefficients). Therefore, if the bit quota is set such that the dynamic memory is not sufficient to store all coefficients, the stronger coefficients will be retained to minimize the quality impairment to the voice signals.

Figure 8:
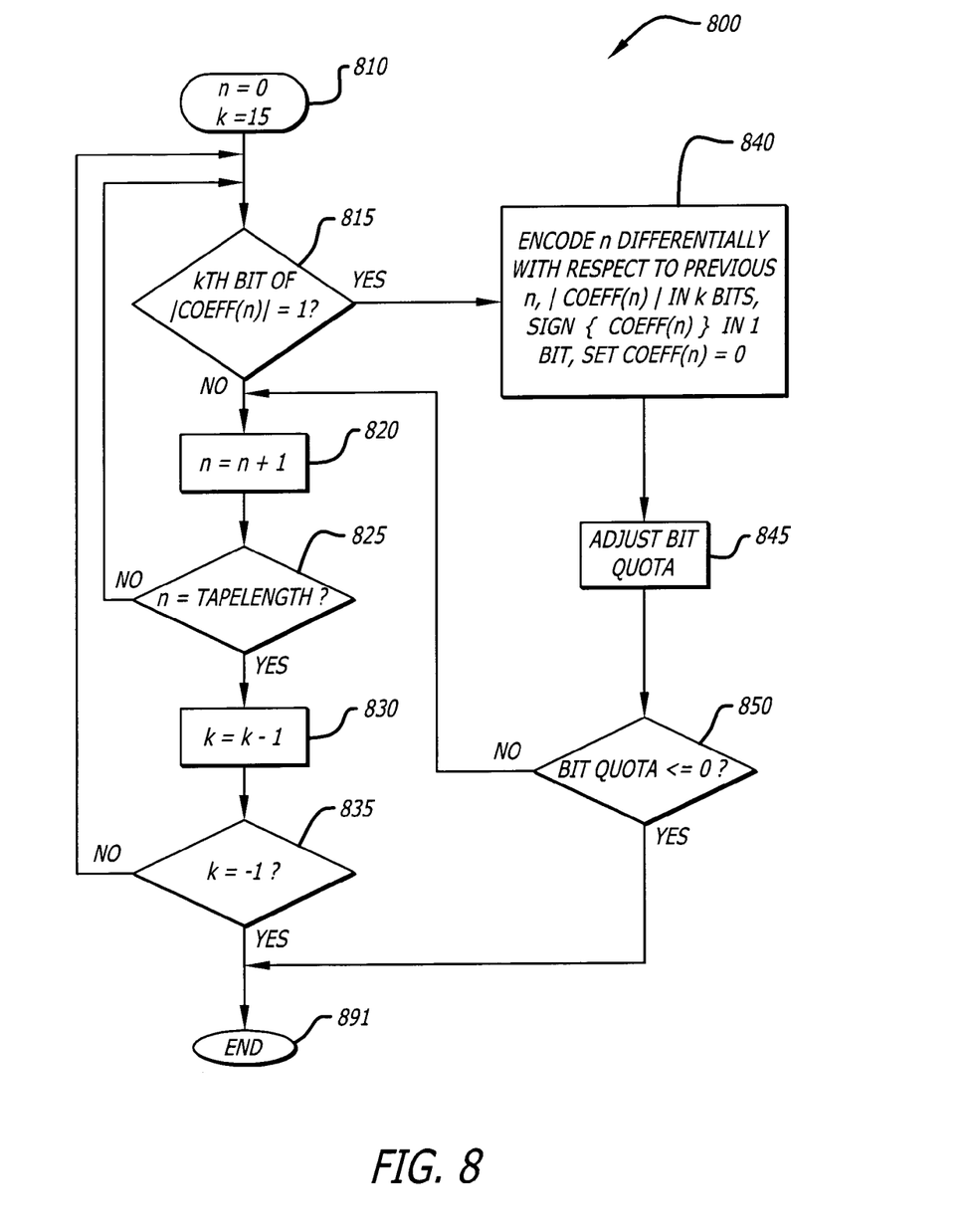
FIG. 8 illustrates a flow diagram of a method for reducing memory storage requirements of an echo canceller according to one embodiment of the present invention.

FIG. 8 illustrates a flow diagram of a process 800 for reducing memory storage requirements of an echo canceller according to one embodiment of the present invention. In this example, it is again assumed that the magnitude subarray of the original, uncompressed coefficient array is considered a two-dimensional array (e.g., with 512 rows and 14 columns, shown in FIG. 7). At block 810, n is set to 0 and k is set to 15 where n represents the row number and k represents the column number. At decision block 815, the process proceeds to block 840 if the $k^{th}$ bit of $n^{th}$ coefficient is "1". Otherwise the process proceeds to block 820 to increment n by one to advance to the next row. At decision block 825, the process proceeds to block 830 to decrement k by one in order to advance to the next column. Otherwise, the process loops back to block 815. At decision block 835, the process proceeds to end at block 891 if k equals to −1 (all coefficients have been processed). Otherwise, the process loops back to block 815. At block 840, the position of the "1" bit encountered and the respective coefficient are encoded as described above. In one embodiment, the position of the respective coefficient is encoded differentially with respect to the position of the previously encountered coefficient. In one embodiment, the $n^{th}$ coefficient is encoded with k bits, the sign of the $n^{th}$ coefficient is coded with 1 bit. The $n^{th}$ coefficient that has just been processed is then removed from the magnitude array (set the $n^{th}$ coefficient=0) so that it will not be processed again. At block 845, the bit quota is adjusted accordingly based on the number of bits used for encoding the $n^{th}$ coefficient. At decision block 850, the process proceeds to end at block 891 if the bit quota is less than or equal to 0 (i.e., the compression ratio has been reached and there is no more memory for additional coefficients). Otherwise, the process proceeds to block 820 to advance to the next row (i.e., the next coefficient).

Figure 9:
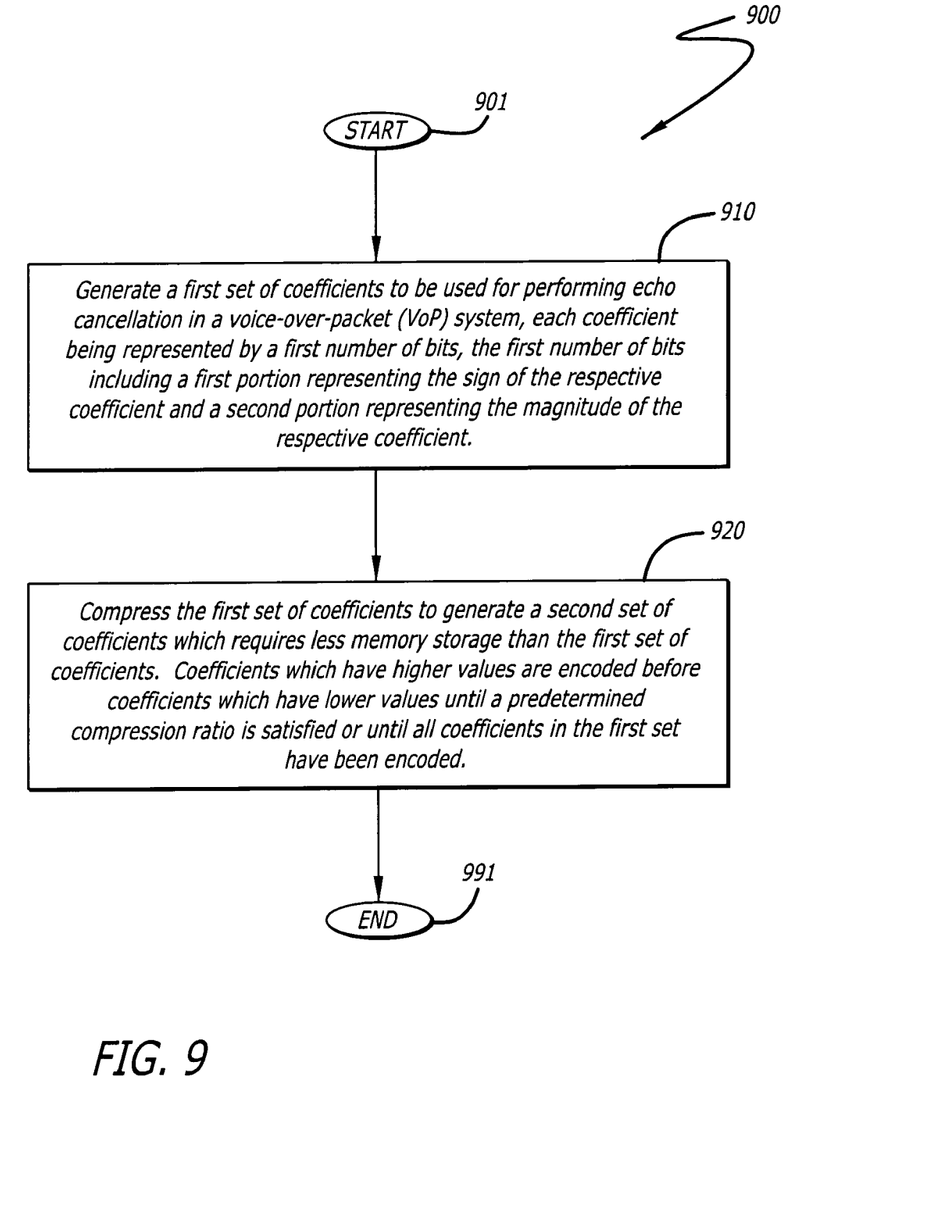
FIG. 9 is a flow diagram of a method in accordance with one embodiment of the present invention.

FIG. 9 is a flow diagram of a method in accordance with one embodiment of the present invention. At block 910, a first set of coefficients is generated for performing echo cancellation in a voice-over-packet (VoP) system. Each coefficient is represented by a first number of bits which includes a first portion representing the sign of the respective coefficient and a second portion representing the magnitude of the respective coefficient. At block 920, the first set of coefficients is compressed to generate a second set of coefficients which requires less memory storage than the first set of coefficients, in which coefficients which have higher values are encoded before coefficients which have lower values until a predetermined compression ratio (e.g., the bit quota) is satisfied or until all coefficients in the first set have been encoded.

Another embodiment of the invention can be used to improve performance of echo canceller in terms of memory storage requirements, speed of convergence, as well as computational speed. In this embodiment, the coefficients in the neighborhood of one of the largest coefficients (e.g., the first encoded coefficient) are encoded using same number of bits as the first encoded coefficient. In this embodiment, the overhead for encoding the position of these coefficients in subsequent traversal is reduced. Furthermore, in network echo canceller applications, these coefficients represent the impulse response of the prominent echo and preserving the shape of this impulse response ensures rapid convergence and voice quality.

While various embodiments of the present invention have been described herein with respect to the compression of echo cancellation (ECAN) coefficients for the purposes of explanation and illustration, it should be recognized by one skilled in the art that the teachings of the present invention are not limited to compression of ECAN coefficients but can also be utilized in various applications. For example, the teachings of the present invention can be used to improve ECAN convergence performance regardless of memory savings. Furthermore, the teachings of the present invention can be applied to the compression of audio transform coefficients. For example, the current method of rate-distortion iterative quantization and lossless coding of MDCT coefficients in MP3/MPEG-AAC/MPEG-4 audio codecs can be replaced with the new compression method described herein. The new compression method as described herein can be used to quantize coefficients in one step (no iterations) and thus can reduce the complexity significantly. This can be used as a part of consumer AAC encoder, for streaming audio and CD-ripping applications, etc.

While the invention has been described in terms of several embodiments, those of ordinary skill in the art will recognize that the invention is not limited to the embodiments described herein. It is evident that numerous alternatives, modifications, variations and uses will be apparent to those of ordinary skill in the art in light of the foregoing description.

What is claimed is:

1. A method comprising:
   generating a first set of coefficients, each coefficient being represented by a first number of bits, the first number of bits including a first portion representing the sign of the respective coefficient and a second portion representing the magnitude of the respective coefficient; and
   compressing the first set of coefficients to generate a second set of coefficients which requires less memory storage than the first set of coefficients, wherein coefficients which have higher values are encoded before coefficients which have lower values until a predetermined compression ratio is satisfied or until all coefficients in the first set have been encoded.

2. The method of claim 1 further including:
   determining a memory requirement for the first set of coefficients; and
   setting a memory requirement for the second set of coefficients based on the memory requirement for the first set and the predetermined compression ratio.

3. The method of claim 1 wherein compressing the first set includes:
   performing a set of operations iteratively until the predetermined compression ratio is satisfied or until all coefficients in the first set have been processed, including:
      identifying those coefficients in the first set which have higher values relative to other coefficients in the first set;
      encoding the identified coefficients; and
      marking the coefficients in the first set that have been encoded so that they are not processed again in subsequent iterations.

4. The method of claim 3 wherein identifying includes:
   traversing the first set of coefficients unit a coefficient in the first set whose most significant bit having a non-zero value is detected; and
   encoding the relative position of the respective coefficient.

5. The method of claim 4 wherein encoding the identified coefficients includes:
   encoding the respective coefficient with full precision in the second set of coefficients including the relative position of the respective coefficient.

6. The method of claim 5 wherein marking includes:
   removing the respective coefficient from the first set.

7. The method of claim 6 wherein marking includes:
   replacing the respective coefficient in the first set by a zero value.

8. A method comprising:
   receiving a first array of coefficients each being represented by a first number of bits which includes a first portion representing the sign of the respective coefficient and a second portion representing the magnitude of the respective coefficient; and
   performing compression operations on the first array of coefficients to obtain a second array of coefficients which requires less memory storage than the first set of coefficients, wherein coefficients in the first array which have higher values relative to other coefficients in the first array are given higher priority for being encoded in the second array.

9. The method of claim 8 further including:
   determining an amount of memory that is required for storing the second array based on the size of the first array and a predetermined compression ratio.

10. The method of claim 9 wherein the first array includes a first sub-array for holding the sign data of the corresponding coefficients and a second sub-array for holding the magnitude data of the corresponding coefficients.

11. The method of claim 10 wherein performing compression operations on the first array includes:
    performing a set of operations on the second sub-array iteratively starting from the most significant bit (MSB) of a first predetermined entry in the second sub-array until a first condition is met, including:
       detecting whether the current bit of the current entry in the second sub-array has a non-zero value;

if the current bit has a non-zero value, encoding the corresponding coefficient in the second array; and marking the corresponding entry in the second sub-array so that it will not be processed again.

12. The method of claim 11 wherein the first predetermined entry corresponds to the lowest indexed entry in the second sub-array.

13. The method of claim 11 wherein the first predetermined entry corresponds to the highest indexed entry in the second sub-array.

14. The method of claim 11 wherein the first condition is met when the amount of memory required for storing the second array has been reached.

15. The method of claim 11 wherein the first condition is met when all coefficients in the first array have been processed.

16. An apparatus comprising:

logic to generate a first set of coefficients, each coefficient being represented by a first number of bits, the first number of bits including a first portion representing the sign of the respective coefficient and a second portion representing the magnitude of the respective coefficient; and logic to compress the first set of coefficients to generate a second set of coefficients which requires less memory storage than the first set of coefficients, wherein coefficients which have higher values are encoded before coefficients which have lower values until a predetermined compression ratio is satisfied or until all coefficients in the first set have been encoded.

17. The apparatus of claim 16 further including:

logic to determine a memory requirement for the first set of coefficients;

logic to determine a memory requirement for the second set of coefficients based on the memory requirement for the first set and the predetermined compression ratio.

18. The apparatus of claim 16 wherein logic to compress the first set includes:

logic to perform a set of operations iteratively until the predetermined compression ratio is satisfied or until all coefficients in the first set have been processed, including:

logic to identify those coefficients in the first set which have higher values relative to other coefficients in the first set;

logic to encode the identified coefficients; and logic to mark the coefficients in the first set that have been encoded so that they are not processed again in subsequent iterations.

19. The apparatus of claim 18 wherein logic to identify includes:

logic to traverse the first set of coefficients unit a coefficient in the first set whose most significant bit having a non-zero value is detected; and logic to encode the relative position of the respective coefficient.

20. An echo canceller comprising:

logic to receive a first array of coefficients each being represented by a first number of bits which includes a first portion representing the sign of the respective coefficient and a second portion representing the magnitude of the respective coefficient; and logic to perform compression operations on the first array of coefficients to obtain a second array of coefficients which requires less memory storage than the first set of coefficients, wherein coefficients in the first array which have higher values relative to other coefficients in the first array are given higher priority for being encoded in the second array.

21. The echo canceller of claim 20 wherein logic to perform compression includes:

logic to determine an amount of memory that is required for storing the second array based on the size of the first array and a predetermined compression ratio.

22. The echo canceller of claim 21 wherein the first array includes a first sub-array for holding the sign data of the corresponding coefficients and a second sub-array for holding the magnitude data of the corresponding coefficients.

23. The echo canceller of claim 22 wherein logic to perform compression operations on the first array includes:

logic to perform a set of operations on the second sub-array iteratively starting from the most significant bit (MSB) of a first predetermined entry in the second sub-array until a first condition is met, including:

logic to detect whether the current bit of the current entry in the second sub-array has a non-zero value;

if the current bit has a non-zero value, logic to encode the corresponding coefficient in the second array; and logic to mark the corresponding entry in the second sub-array so that it will not be processed again.

24. A system comprising:

an echo canceller coupled to perform echo cancellation with respect to input signals received from one or more channels;

a memory including a plurality of dynamic memory blocks that are used by the echo canceller to perform its corresponding functions; and a memory controller coupled to the echo canceller and the memory, the memory controller to facilitate data transfer between the echo canceller and the memory, wherein the echo canceller includes logic to perform compression operations on a first array of coefficients to obtain a second array of coefficients which requires less memory storage in the memory than the first set of coefficients, and wherein coefficients in the first array which have higher values relative to other coefficients in the first array are given higher priority for being encoded in the second array.

25. The system of claim 24 wherein the first array includes a first sub-array for holding the sign data of the corresponding coefficients and a second sub-array for holding the magnitude data of the corresponding coefficients.

26. The system of claim 24 wherein logic to perform compression includes:

logic to determine an amount of memory that is required in the global memory for storing the second array based on the size of the first array and a predetermined compression ratio.

27. The system of claim 25 wherein logic to perform compression operations on the first array includes:

logic to perform a set of operations on the second sub-array iteratively starting from the most significant bit (MSB) of a first predetermined entry in the second sub-array until a first condition is met, including:

logic to detect whether the current bit of the current entry in the second sub-array has a non-zero value;

if the current bit has a non-zero value, logic to encode the corresponding coefficient in the second array; and logic to mark the corresponding entry in the second sub-array so that it will not be processed again.

28. A machine-readable medium comprising instructions which, when executed by a machine, cause the machine to perform operations including:
- generating a first set of coefficients to be used for performing echo cancellation in a voice-over-packet (VoP) system, each coefficient being represented by a first number of bits, the first number of bits including a first portion representing the sign of the respective coefficient and a second portion representing the magnitude of the respective coefficient; and
- compressing the first set of coefficients to generate a second set of coefficients which requires less memory storage than the first set of coefficients, wherein coefficients which have higher values are encoded before coefficients which have lower values until a predetermined compression ratio is satisfied or until all coefficients in the first set have been encoded.

29. The machine-readable medium of claim 28 further including:
- determining a memory requirement for the first set of coefficients; and
- setting a memory requirement for the second set of coefficients based on the memory requirement for the first set and the predetermined compression ratio.

30. The machine-readable medium of claim 28 wherein compressing the first set includes:
- performing a set of operations iteratively until the predetermined compression ratio is satisfied or until all coefficients in the first set have been processed, including:
  - identifying those coefficients in the first set which have higher values relative to other coefficients in the first set;
  - encoding the identified coefficients; and
  - marking the coefficients in the first set that have been encoded so that they are not processed again in subsequent iterations.

* * * * *